(12) United States Patent
Beauvent et al.

(10) Patent No.: US 6,833,105 B2
(45) Date of Patent: Dec. 21, 2004

(54) METHOD FOR MAKING ALUMINATE CEMENT

(75) Inventors: Guy Beauvent, Wierre Effroy (FR); Michel Deletter, Jurbise (BE); Eric Holard, Calais (FR); Jacques Tirlocq, Baudour (BE)

(73) Assignee: Carrieres du Boulonnais, Ferques (FR)

( * ) Notice: Subject to any disclaimer, the term of this patent is extended or adjusted under 35 U.S.C. 154(b) by 464 days.

(21) Appl. No.: 09/933,130

(22) Filed: Aug. 21, 2001

(65) Prior Publication Data

US 2003/0001306 A1 Jan. 2, 2003

(30) Foreign Application Priority Data

May 23, 2001 (FR) .............................................. 01 06830

(51) Int. Cl.⁷ .......................... B28B 5/02; B28B 11/24; B65G 49/08; F27B 9/00
(52) U.S. Cl. ...................... 264/606; 264/609; 264/651; 264/680; 264/86; 264/87; 264/519; 264/210.5; 432/11; 432/13; 432/18
(58) Field of Search ................................. 264/606, 609, 264/651, 680, 86, 87, 519, 210.5; 432/11, 13, 18

(56) References Cited

U.S. PATENT DOCUMENTS

| | | | | |
|---|---|---|---|---|
| 3,716,387 A | * | 2/1973 | Simmons et al. | 106/750 |
| 3,883,294 A | | 5/1975 | Ritzmann et al. | 432/107 |
| 4,036,657 A | * | 7/1977 | Mehta | 106/757 |
| 4,123,288 A | * | 10/1978 | Stringer et al. | 106/745 |
| 4,193,761 A | * | 3/1980 | Mantegani | 432/128 |
| 4,337,035 A | * | 6/1982 | Barchi | 432/246 |
| 4,384,848 A | * | 5/1983 | Marazzi | 432/11 |
| 4,496,396 A | * | 1/1985 | Steinbiss et al. | 106/750 |
| 4,530,651 A | * | 7/1985 | Bucchi | 425/94 |
| 4,828,489 A | * | 5/1989 | Albonetti | 432/5 |
| 4,943,323 A | * | 7/1990 | Gartner et al. | 106/808 |
| 4,966,547 A | * | 10/1990 | Okuyama et al. | 432/9 |
| 5,288,227 A | * | 2/1994 | Righetti | 432/85 |
| 5,648,042 A | | 7/1997 | Miller, Jr. | 266/44 |

FOREIGN PATENT DOCUMENTS

| | | |
|---|---|---|
| DE | 24 05 413 A1 | 8/1975 |
| DE | 34 17 247 A1 | 11/1985 |
| FR | 2 311 763 A | 12/1976 |
| GB | 2 018 962 A | 10/1979 |
| RU | 2012544 C1 | 5/1994 |
| SU | 859331 B | 8/1981 |

* cited by examiner

Primary Examiner—Michael P. Colaianni
Assistant Examiner—Michael I. Poe
(74) Attorney, Agent, or Firm—Leydig, Voit & Mayer, Ltd.

(57) ABSTRACT

A process of manufacturing a sulfoaluminate or ferroaluminate cement, and an apparatus for the manufacture. The cement is manufactured from a mixture containing $CaCO_3$, $Al_3$ and/or $Al(OH)_3$, $CaSO_4$, $SiO_2$ and/or a product containing silica or silicates such as clay, these compounds being present in the anhydrous or hydrated form. In this process, the mixture is treated up to clinkering by movement in a center of a kiln, in a sheet with approximately constant thickness, at approximately constant speed, along a treatment path having a positive temperature gradient, and for a treatment time during which the mixture remains below its melting temperature. The mixture is clinkered to produce a clinkered mixture that is cooled upon exit from the treatment path.

17 Claims, 2 Drawing Sheets

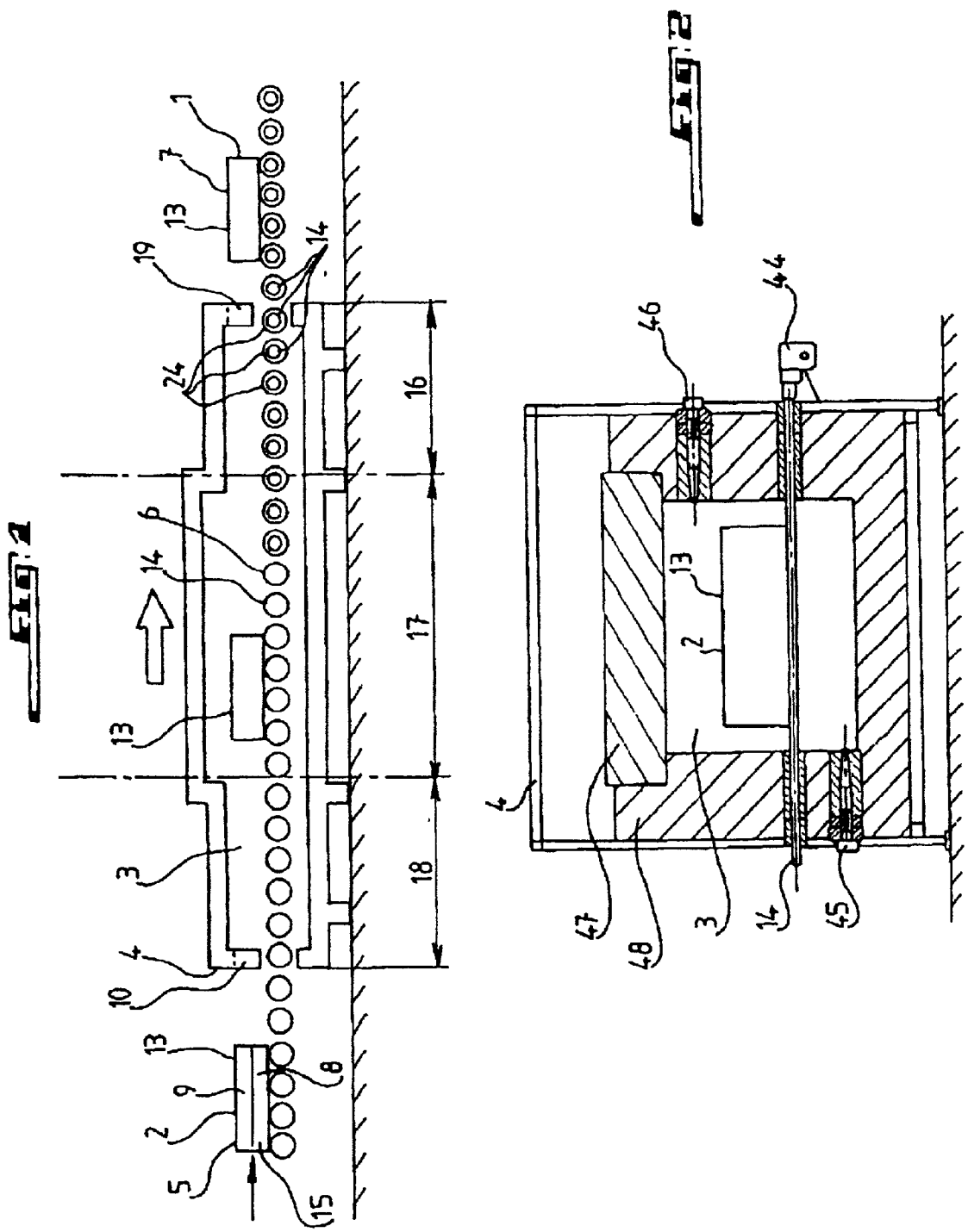

METHOD FOR MAKING ALUMINATE CEMENT

FIELD OF THE INVENTION

The present invention concerns generally, and according to the first of its aspects, the cement industry. More specifically, the invention concerns, according to its first aspect, a manufacturing process of a cement from a first raw mix formed from a mixture consisting of the compounds $CaCO_3$, $Al_2O_3$ and/or $Al(OH)_3$, $CaSO_4$, $SiO_2$ and/or a product containing silica or silicates such as clay, all these compounds being present in anhydrous or hydrated form, individually or in combination.

BACKGROUND

Cements of this type, which are called sulfoaluminate cements, have been used since 1974 for constructions in China. These cements form a new class of construction materials which are different from the portland cements, which have been known for approximately 150 years, or aluminous cements invented by the Lafarge Company at the beginning of the 20$^{th}$ century.

The preparation of cement includes cooking of a base or raw mixture. The quality of the heat treatment for transformation of this raw mix into clinker will be determined to obtain cement with satisfactory mechanical properties during its use.

The kilns usually encountered in cement making are tubular and rotary. These kilns have been used for more than fifty years for the preparation of portland cements.

In a known way, a raw mix for obtaining sulfoaluminate cement is introduced at the first end of the center of an approximately horizontal tubular kiln in the form of flour, then is heated by the combustion gases derived from a burner placed at a second end of the center. The center of the tubular kiln is mounted so that it rotates around its axis of symmetry and is slightly inclined towards the burner, such that the rotation of the tube causes the rotation and the fall of the flour towards the burner at the second end of the center.

In proportion to its progression in the kiln, the flour is reheated and successively undergoes dehydration, decarbonation and clinkering.

However, because of the variability of the speed of movement of the flour in the center, this type of kiln does not make it possible to obtain a clinker of constant quality. In fact, it turns out that the flour remains stuck to the walls of the kiln and has a prolonged residence time. Likewise, the flour can go more rapidly from the first to the second end of the kiln without having been treated satisfactorily.

The use of raw mixes containing iron oxides to obtain ferroaluminate cements under conditions similar to those described above for the preparation of sulfoaluminate cements leads to worsening of the problems of sticking to the walls of the kiln. An increased crusting of the kiln is then observable, particularly in the clinkering zone where the iron oxides are in the liquid state.

Another solution can consist of using a kiln with a fixed center in which the raw mix is brought progressively to the clinkering temperature, then cooled and milled.

This technique has the drawback of being expensive because of the heat losses connected with the heating then the cooling of the kiln between each cycle. Furthermore, the operating method of this type of kiln is not suitable for production of large amounts of clinker. Since the mixture to be clinkered is immovable, heterogeneous zones appear in the clinker because of local variations in the temperature in the kiln.

SUMMARY OF THE INVENTION

In this context, the invention has the goal of proposing a process enabling the production of sulfoaluminate cement of constant quality under industrially acceptable conditions. These conditions include minimizing the consumption of energy which is a determining parameter in the cost of the cement.

To this end, the cement manufacturing process according to the invention moreover conforms to the generic definition that is given in the preamble above, is essentially characterized in that the mixture is treated up to the clinkering by movement in a kiln center, with a sheet of approximately constant thickness, at approximately constant speed, along a treatment path subjected to a positive gradient of temperature, and during a treatment time during which this mixture remains below its melting temperature, and in which the clinkered material forming a sulfoaluminate cement is cooled upon exit of the treatment path.

Such a process makes it possible to improve the respective drawbacks of the tubular kiln with a rotary center and kilns with a fixed center, by the movement at controlled speed of a predetermined amount of mixture to be clinkered in an atmosphere at controlled temperature and which can be regulated.

Furthermore, even because of the layout of the kiln, it is possible to vary the composition of the hot gases circulating in the center, and therefore, the selection of a locally oxidizing or reducing atmosphere; for example, by evacuating the flue gases produced in the clinkering zone in any of the parts of the kiln or even by varying the oxygen content during combustion.

In addition, the mixture can consist of $Al_2(SO_4)_3$ in anhydrous or hydrated form. $Al_2(SO_4)_3$ can represent up to 10 wt % of the mixture.

The composition to be treated by the process according to the invention can in addition consist of at least one mineral phase high in at least one iron oxidation product to obtain a second raw mix, said cement then forming ferroaluminate cement.

In addition, the mixture can consist of an oxide of transition metal chosen from Sc, Ti, V, Cr, Mn, Fe, Co, Ni, Cu, Zn, Y, Zr, Nb, Mo, Cd, La, Hf, Ta and W.

The transition metal oxide can represent up to 5–10 wt % of the mixture.

The process of the invention can consist of the preparation of the composition by steps of (i) mixing of each of its constituents with water to obtain a slurry, (ii) filtering said slurry to obtain a pasty residue, (iii) transforming said residue with a view to its introduction into the kiln.

According to the process of the invention, the first pasty raw mix can be transformed by mixing then extrusion, preferably in plates or in strips with approximately constant thickness.

The first pasty raw mix can also be extruded in the form of varied geometrical units, insofar as they make it possible to obtain a clinkered product of satisfactory quality at the end of the heat treatment because of the speed of diffusion of the heat to the interior of the section. Thus, cylindrical or ovoid rods or even hollow bricks can be appropriate.

During the use of a composition consisting of iron oxidation products, the second raw mix can be deposited before clinkering on an underlayer of the first raw mix.

Preferably, the movement of the composition in the center of the kiln is carried out on rollers.

The rollers present in a clinkering zone of the center of the kiln can be silicon carbide, possibly coated with silicon, or $MgO$—$ZrO_2$.

Coatings of $MgO$—$ZrO_2$ can be obtained by depositing under vacuum, according to a technique called CVD (Chemical Vapor Deposition).

The rollers present in a clinkering zone of the center of the kiln can be coated with a refractory stainless steel with a melting point higher than 1400° C. These coatings of stainless steel can consist of sleeves mounted so that they each rotate freely around a roller. A preferred refractory stainless steel can be an alloy with a high content of nickel, for example, Inconel®, Inconel 601® or even Inconel 706®. It has been observed that during use between 1300 and 1400° C., the sleeves mounted to freely rotate could possibly yield but presented good mechanical resistance to plating, wearing and corrosion. Therefore, they are particularly adapted for the manufacture of cement by the process of the invention.

Because of the particular composition of the raw mixes used in the invention, it is necessary for the clinkering to be carried out in an oxidizing atmosphere. This oxidizing atmosphere is obtained with the aid of gaseous oxygen in the clinkering zone of the raw mix.

According to the manufacturing process of the invention, the mixture undergoes, along the path of the treatment, successively, (I) possibly a drying and/or dehydration (II) decarbonation and (III) clinkering.

The clinkered mixture obtained by a process in conformance with the invention can be milled and mixed with limestone and/or gypsum and/or anhydrite and possibly heavy metals or oxidation compounds of heavy metals.

According to a second of these aspects, the invention concerns cement obtained according to a process in conformance with its first aspect.

According to a third of these aspects, the invention concerns a manufacturing installation of cement consisting of a tank and a mixer for preparing a first raw mix formed by a mixture consisting of the compounds $CaCO_3$, $Al_2O_3$ and/or $Al(OH)_3$, $CaSO_4$, $SiO_2$ and/or a product containing silica or silicates such as clay. All these compounds are present in anhydrous or hydrated form, individually or in combination.

The installation consists of a kiln and a kiln center, to treat the mixture up to clinkering by movement in said kiln center. The movement is carried out with a sheet of approximately constant thickness, at approximately constant speed, along a treatment path subjected to a positive temperature gradient, and during a treatment time during which this mixture remains below its melting temperature. The installation consists of equipment for rapid cooling of the clinkered mixture upon exit from the treatment path.

The rapid cooling of the clinker can be advantageously carried out by means of cooled gaseous nitrogen or even liquid nitrogen. The nitrogen used for cooling the clinker can originate advantageously from the distillation of the air in an installation making it possible to simultaneously produce on the one hand, liquid or gaseous oxygen and on the other hand, liquid or gaseous nitrogen. The oxygen produced is used during the clinkering step.

According to a preferred embodiment method, the installation of the invention can include (i) a first mixer associated with a tank for obtaining a slurry during the combination of the mixture with the water, (ii) a filter press for filtration of said slurry in order to obtain a pasty residue and (iii) an extruder for transforming said pasty residue, with a view to its introduction into the kiln.

This installation can in addition include a mixer for homogenization of the pasty residue derived from the filtration, and an extruder for its transformation into plates or strips with approximately constant thickness.

The center of the kiln can include rollers for movement of the mixture.

The installation according to the invention can use means for preparing a second cement raw mix including, in addition, at least one mineral phase high in at least one iron oxidation product. Such a second raw mix provides, after clinkering, a ferroaluminate cement.

The installation according to the invention in addition can consist of means for depositing the second raw mix on an underlayer of the first raw mix before clinkering.

The installation according to the invention can use a first grinding mill of clinkered mixture, a second mixer in which there is added to the clinkered mixture milled limestone and/or gypsum and/or milled anhydrite, and possibly heavy metals or oxidation compounds of milled heavy metals.

The invention uses several silos or hoppers, several conveyers, and several pipes for storage and transport of the products intended for the manufacture of sulfoaluminate cement.

BRIEF DESCRIPTION OF THE DRAWINGS

The invention will be better understood and other goals, characteristics, details and advantages of the latter will appear more clearly during the description that will follow by referring to the diagrams attached, given only by way of nonlimiting examples and in which:

FIG. 1 represents a longitudinal section of a kiln usable for the implementation of the process in conformance with the invention;

FIG. 2 represents a transverse section of a kiln usable for the implementation of a process in conformance with the invention;

DETAILED DESCRIPTION

Figure 3:
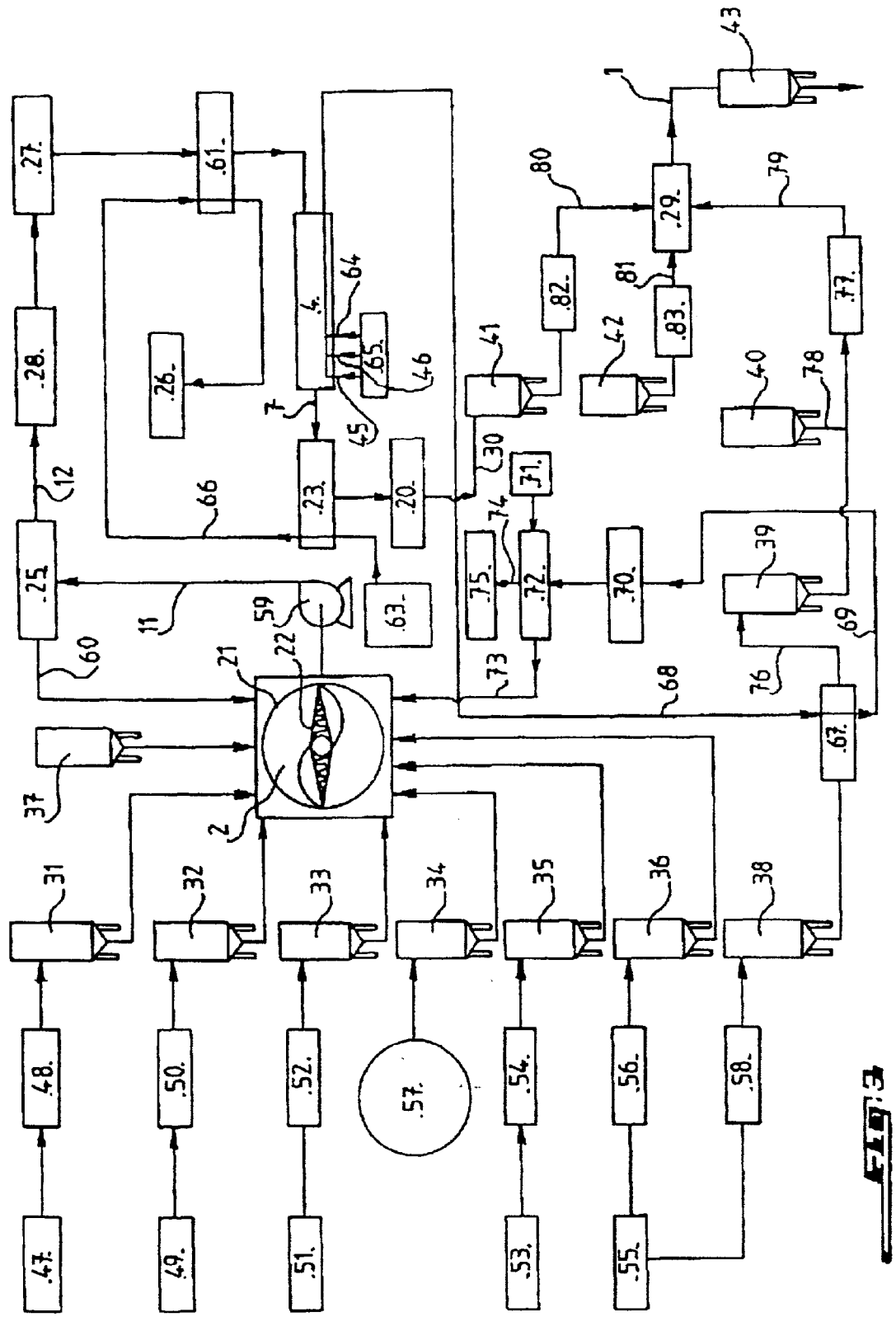
FIG. 3 represents a summary diagram of an installation for the implementation of a process in conformance with the invention.

FIG. 1 diagrammatically represents a kiln 4 in longitudinal section, including plates 13 which form the product before undergoing heat treatment. These plates 13 are deposited on rollers 14 which act to move them along a center 3 of the kiln 4.

Plates 13 enter the kiln by an inlet opening 10 where they undergo progressive reheating in a drying and/or dehydration zone 18 at a temperature going from approximately 250° C. to approximately 500° C. The plates 13 next go into a decarbonation zone 17 where they are brought to a higher temperature going from approximately 500° C. to approximately 1000° C. Finally, plates 13 are led into an oxidizing atmosphere in clinkering zone 16 where they are brought to a temperature going from approximately 1000° C. to approximately 1400° C., without, however, passing through a pasty state usually occurring between 1300° C. and 1350° C. in the absence of compounds modifying the melting temperature of the mixture 2. It is desirable to avoid reaching the pasty state, because the latter is responsible for the phenomenon of clinker coating on the rollers 14.

In order to avoid clinker coating on the rollers in the clinkering zone 16, it is preferable to use rollers of silicon carbide or silicon carbide impregnated with silicon or MgO—Zr or any type of nonwetting coating for melted minerals contained in the solid raw mix; these melted minerals are responsible for the clinker coating on the rollers.

The use of flux powders, especially those containing the elements boron, phosphorus, and fluorine, lowers the melting temperature of the mixture. In this case, the maximum temperature of the clinkering will be reduced.

Likewise, the use of certain compounds will increase the melting temperature of the mixture, for example, up to 1400–1500° C. with, as a consequence, a modification of the proportions between the crystalline phases and the amorphous phases, as well as proportions of the mineral compounds forming the clinker.

Alternatively, and not represented, the plates 13 can form an uninterrupted strip circulating in the drying and/or dehydration zone 18 to the clinkering zone 16 of the center of the kiln.

The average residence time of the plates or strips 13 in each of the zones 18 to 16 is similar to that usually necessary during the use of rotary kilns. The residence time depends especially on the dimensions of the plates or strips 13, of the power of the kiln, of the heat capacity and the heat conductivity of the plates or strips 13, and of the gases circulating in the center of the kiln. These parameters can be determined according to known techniques requiring knowledge of the mineral phases of different clinkers by specialists in the manufacturing of clinkers and cements.

After passage into the clinkering zone 16, the plates 13 leave the kiln by a discharge opening 19.

Plates 13 are formed by a mixture 2 consisting of compounds $CaCO_3$, $Al_2O_3$ and/or $Al(OH)_3$, $CaSO_4$, $SiO_2$ and/or a product containing silica or silicates such as clay, all these compounds being present in anhydrous or hydrated form, individually or in combination.

Mixture 2 forms a first raw mix 8, before its introduction into the kiln 4.

The usual weight percentages of the different constituents of the first raw mix are:

| | |
|---|---|
| $Al_2O_3$: | 20–55% |
| Clay: | 0–30% |
| Limestone: | 10–35% |
| Gypsum: | 10–15% |
| Total content of $SiO_2$: | 1–15% |

Preferably:

$Al_2O_3$ is in the form of hydroxylated bauxite, preferably gibbsite: $Al(OH)_3$, or boehmite: $AlO(OH)$, or diaspore: $Al_2O_3.H_2O$, or a combination of at least two of these compounds.

Clay derived from washing slurry of the limestone from limestone quarries, and then formed into clay-limestone fines (FAC).

The origin of the limestone is unimportant.

Gypsum can be replaced by anhydrite or any hydrated calcium sulfate.

$SiO_2$ can originate from flue gas of silica or bauxite or clay when they are present.

Mixture 2 which is treated up to the clinkering step by movement in the center 3 of the kiln 4 in sheet 5 with approximately constant thickness, is moved at approximately constant speed along a treatment path 6 subjected to a positive temperature gradient such as described above.

In a manner not represented, the plates 13, then forming a clinkered mixture 7, are next cooled at their discharge from the kiln.

Plates 13 can in addition consist of a mineral phase high in at least one iron oxidation product to obtain a second raw mix to obtain ferroaluminate cement.

The iron oxidation product used will be $Fe_2O_3$, $FeO(OH)$, $Fe_3O_4$, FeO or even $Fe(OH)_3$. Preferably, the iron oxidation product will be derived from bauxite high in iron.

Usually, naturally available bauxite high in iron will consist of 65–95% $Al_2O_3$, 3–35% $Fe_2O_3$, 0–13% $SiO_2$, 0–7% $TiO_2$.

The usual weight percentages of these different constituents are:

Bauxite high in iron: 10–45%

Clay: 0–30%

Limestone: 25–45%

Gypsum: 10–15%

Total content of $SiO_2$: 1–15%

Mixture 2 containing iron forms a second raw mix 9 before its introduction into the kiln 4.

During the preparation of the cement, the second raw mix 9 is preferably deposited on an underlayer 15 of the first raw mix 8, before introduction into the kiln. This manner of proceeding makes it possible to avoid contact between the rollers and the second raw mix high in iron and responsible for clinker coating problems.

According to a variant that is not represented, another solution to avoid clinker coating of the second raw mix on the rollers can consist of heat treatment of mixture 2 in refractory boxes. In this case, the use of components of the mixture 2 in the form of dry or moist powder will be possible.

According to another variant that is not represented, powders such as muscovites, talc, or even silica could also be deposited on at least one surface of the raw mix designed to be in contact with the rollers.

According to another variant, each of the rollers 14 of the clinkering zone 16 can be coated with a sleeve 24 made from refractory stainless steel. This sleeve 24 is mounted so that it rotates freely around the roller 14.

In FIG. 2, the kiln 4 usable for implementing a process in conformance with the invention is operating.

In center 3, plate 13 can be observed formed by a mixture 2 supported and transported by roller 14.

The rotation of roller 14 is ensured by motor 44.

Above and below plate 13, burners 45 and 46 make it possible to bring the plate 13 to the desired temperature.

In order to limit heat losses, kiln 4 is provided with pieces of refractory materials 47, 48 which can be brick or asbestos.

FIG. 3 represents a summary diagram of an installation for implementation of a particularly preferred process in conformance with the invention, called "by the wet route."

The cement manufacturing installation 1 consists of a tank 21 and a first mixer 22 for preparing a mixture 2. The mixture 2 contains different constituents derived from silos or hoppers 31–37 in variable proportions.

Thus, a first silo 31 contains an additive 47 in the form of a powder. This powder is obtained by milling the additive 47 in a second grinding mill 48. The additive 47 can be formed by a compound of a transition metal chosen from Sc, Ti, V, Cr, Mn, Co, Ni, Cu, Zn, Y, Zr, Nb, Mo, Cd, La, Hf, Ta, and W. The transition metal compound will be preferentially chosen from hydroxides, oxides and sulfates. A more preferred transition metal compound will be an oxide.

The transition metal oxide can represent up to 5–10 wt % of the mixture.

The additive 47 is mixed with water before introduction into the tank 21.

Bauxite 49 is milled in a third grinding mill 50, and then is stored in a second silo 32.

A third silo 33 serves as a tank for the storage of gibbsite 51 after milling in the presence of water in a fourth grinding mill 52.

A fourth silo 34 acts as reservoir for storage of clay-limestone fines 57 derived from limestone washing originating from limestone quarries.

Limestone 53 is milled in a fifth grinding mill 54, then is stored in a fifth silo 35.

A first part of gypsum 55 is milled in the presence of water in sixth grinding mill 56, then is stored in a sixth silo or tank 36.

Finally, a seventh silo 37 contains a "corrector" intended to modify the physicochemical properties of the mixture 2 according to the qualities of the raw mixes, in order to ensure a product of a constant quality. This "corrector" is one of the products contained in silos 31 to 36.

Mixture 2 which forms slurry 11 after homogenization in the tank 21 is collected by a pump 59. This latter sends the slurry 11 into a filter press 25. The filter press 25, on the one hand, produces a filtrate 60 which returns toward, the tank 21, and on the other hand, produces a pasty residue 12.

The pasty residue 12 is next mixed in a mixer 28, then is transformed with the aid of an extruder 27.

The extruder 27 produces plates or strips 13. These latter are then stored on average for two to three days, then are dried in a first drier 61.

The dried plates or strips 13 are next introduced into kiln 4 to provide a clinker 7 after heat treatment. Clinker 7 is next cooled in a rapid cooling apparatus 23.

A suitable rapid cooling apparatus 23 can be a cooler with a fixed grid and reciprocating movable transverse bars, better known under the name of "cross-bar cooler®" from the FLS Company (Copenhagen, Denmark).

Cooled clinker 7 is then milled in a first grinding mill 20 to provide a milled clinkered mixture 30.

The milled clinkered mixture 30 is stored in an eleventh silo or hopper 41.

The rapid cooling apparatus 23 is fed with a cold fluid 63. This cold fluid 63 can be fresh air or sprayed liquid nitrogen. A reheated gas 66 obtained at the outlet of the cooling apparatus next acts to dry plates or strips 13 in first drier 61. Wet gas obtained at the outlet of the drier is evacuated towards a first chimney 26.

According to an embodiment method that is not represented, part of the reheated gas 66 derived from the rapid cooling apparatus 23 can be used as fuel for burners 45, 46, 64, installed on kiln 4, insofar as the reheated gas 66 contains oxygen.

Burners 45, 46, 64 are fed with fuel 65. Fuel 65 can be advantageously natural gas or one of its separation products. Preferably, fuel 65 can be derived from industrial waste materials, such as fuels high in sulfur or even bone meal.

A second part of the gypsum 55 is milled to dryness in seventh grinding mill 58, then is stored in an eighth silo 38. The eighth silo 38 feeds a second drier 67 with gypsum. The second drier 67 is fed with hot combustion gases 68 coming from kiln 4.

Cooled combustion gases 69 are collected at the exit of the second drier 67, then are dedusted in a dust extractor 70.

The dust extractor 70 can be a filtration apparatus, or an electrostatic precipitator.

The gases derived from the dust extractor 70 are next washed by spraying with water 71 in an apparatus for lessening the flue gases 72. According to variants that are not represented, it is possible to lessen the flue gas with limestone, gypsum, moist raw mix, or even chalk.

On the one hand, one collects washing water 73 which is sent to the tank 21 and on the other hand, lessened dedusted flue gases 74 which are evacuated by a second chimney 75.

Dried gypsum 76 obtained at the exit of the second drier 67 is stored in a ninth silo 39. This latter feeds an eighth grinding mill 77 with dry gypsum.

The eighth grinding mill 77 is also fed with an additional component 78 stored in a tenth silo 40. This additional component 78 can be, for example, limestone, white limestone, dry borogypsum, dry phosphogypsum or even anhydrite.

The additional compound 78 and dry gypsum 76 are useful as additives for the preparation of the cement 1, especially of the modification of such properties as the intake speed or mechanical resistance. The quantities to be added are to be evaluated case by case, according to the needs, and are part of the general skills of the formulators of cement.

The eighth grinding mill 77 provides first flour 79, which feeds a second mixer 29, which is a powder mixer.

The second mixer 29 is also fed (i) with a second flour 80 arising from the milling of the milled clinker 30 in a ninth grinding mill 82, and (ii) with a third flour 81 arising from the milling in a tenth grinding mill 83 of an additive stored in a twelfth silo 42. This additive can be a transition metal oxide, or lead oxide, tin oxide, antimony oxide or bismuth oxide.

The twelfth silo 42 can be used for storage of compounds of heavy metals, for example, in the form of oxides or sulfides. The encapsulation of such compounds of heavy metals is possible because of the very low leaching observed during the use of cements obtained by a process in conformance with the invention.

The second mixer 29 produces a cement 1 which is stored in a thirteenth silo 43. The cement 1 is next removed from the thirteenth silo 43 to be packaged in bags or in bulk and leaves the installation.

According to an embodiment that is not represented, the plates 13 can be prepared by compression of the constituents of the mixture 2 in the form of powder, and in the shape of a tablet. In this case, it is necessary to ensure good homogeneity of the powder. In order to improve the cohesion of the mixture 2 forming the plates, it is possible to carry out compression in the presence of steam. Of course, the step of mixing by the first mixer 22 in the tank 21 is, in this instance, not used, and the use of water is prohibited.

According to a variant that is not represented, the installation can comprise means for depositing a second raw mix 9 containing iron on an underlayer of a first raw mix 8 not containing a significant amount of iron before clinkering.

For example, the deposit of a layer of the second raw mix 9 on an underlayer of the first raw mix 8 can be carried out at the time of the extrusion, or even during the storage step.

EXAMPLE 1

The following products are mixed in the tank 21 (all the percentages are given by weight on a dry basis):

| | |
|---|---|
| White limestone | 35% |
| Bauxite, low in iron | 52% |
| (Analysis: FeO$_2$ <5%; SiO$_2$ 2%; Al$_2$O$_3$ 59%; CaO 4%; SO$_3$ 6%) | |
| Gypsum | 13% |

The products used advantageously have a granulometry from more than 0 μm to 100 μm.

These latter are mixed with water and homogenized over 2–6 h and under the detailed treatment in FIG. 3 without particular specification up to their introduction into the kiln 4.

In kiln 4 the raw mix is dried and preheated to 750° C. for 0.5–1 h in the drying and/or dehydration zone 18 then decarbonated by heating to 1000° C. for 0.6–1.3 h in the decarbonation zone 17, finally to be clinkered by heating to 1330–1400° C. for 0.15–0.85 h.

The clinkered mixture 7 obtained from the kiln outlet is cooled in the rapid cooling apparatus 23 which is here a cooler with a fixed grid and reciprocating movable transverse bars.

The rate of cooling of the clinker between 1350 and 900° C. is preferably between 400 and 1100° C./min; then, the continuation of the cooling must be controlled as is the case for portland cements, in particular between 700 and 500° C., where a rapid cooling is again required in order to avoid undesirable phase transitions, especially the transformation of the phase into C$_2$Sβ into L C$_2$S$_{\gamma}$.

The cooled clinker is next milled and subjected to the treatment recommended in the description of FIG. 3 to obtain sulfoaluminate cement. This treatment consists of mixing additives to the clinker to obtain sulfoaluminate cement with specific properties. Thus, cements are obtained with accelerated slowed cementation or even with increased resistance by using compounds that are usually used by specialists for the formulation of the cements.

EXAMPLE 2

Example 1 is reproduced under similar conditions, except for:

1) The composition of mixture 2 which is the following (percentages given by weight on a dry basis):

| | |
|---|---|
| Clay-limestone fines | 25% |
| Limestone | 29% |
| Bauxite high in iron | 34% |
| (Analysis: Fe$_2$O$_3$ 14%; SiO$_2$ 2%; Al$_2$O$_3$ 55%; CaO 4%; SO$_3$ 6%) | |
| Gypsum | 12% |

2) The mixture 2 which forms a second raw mix 9 is deposited on an underlayer 15 of the first raw mix 8 prepared according to Example 1, before its introduction into the center 3 of the kiln 4.

3) The temperature of the clinkering is between 1300–1350° C.

The cooled clinker is next milled and subjected to the treatment recommended in the description of FIG. 3 to obtain ferroaluminate cement.

EXAMPLE 3

The data and compositions are identical to those of Example 1, except for the composition of the bauxite that is low in iron (Analysis: Fe$_2$O$_3$ 3%; SiO$_2$ 17%; Al$_2$O$_3$ 80%).

EXAMPLE 4

The data and compositions are identical to those of Example 1, except for the bauxite that is low in iron (Analysis: Fe$_2$O$_3$ 5%; SiO$_2$ 10%; Al$_2$O$_3$ 80%; TiO$_2$ 5%).

We claim:

1. A process of manufacturing cement from a first raw mix including a mixture of (i) CaCO$_3$, (ii) at least one of Al$_2$O$_3$ and Al(OH)$_3$, (iii) CaSO$_4$, and (iv) at least one of SiO$_2$ and a product containing silica or silicates, in an anhydrous or hydrated form, the process including treating the mixture before a clinkering stage by movement in the center of a kiln, in a sheet with approximately constant thickness, at approximately constant speed, along a treatment path having a positive temperature gradient, and for a treatment time, during which the mixture remains below its melting temperature, to produce a sulfoaluminate cement, clinkering to produce a clinkered mixture, and cooling the clinkered mixture upon exit from the treatment path.

2. The process of manufacturing cement according to claim 1, including clinkering in the presence of oxygen.

3. The process of manufacturing cement according to claim 1, wherein the mixture is subjected, along the treatment path, successively to drying and/or dehydration, decarbonation, and clinkering.

4. The process of manufacturing cement according to claim 1, including milling the clinkered mixture and mixing the clinkered mixture, after milling, with at least one material selected from the group consisting of limestone, gypsum, anhydrite, heavy metals, and oxidation compounds of heavy metals.

5. The process of manufacturing cement according to claim 1, wherein the mixture contains Al$_2$(SO$_4$)$_3$ in anhydrous or hydrated form.

6. The process of manufacturing cement according to claim 5, wherein the mixture includes up to 10 wt. % of Al$_2$(SO$_4$)$_3$.

7. The process of manufacturing cement according to claim 1, wherein the mixture contains at least one mineral phase including at least one iron oxidation product for obtaining a second raw mix, said cement being a ferroaluminate cement.

8. The process of manufacturing cement according to claim 7, including depositing the second raw mix on an underlayer of the first raw mix before clinkering.

9. The process of manufacturing cement according to claim 1, wherein the mixture contains an oxide of a transition metal chosen from the group consisting of Sc, Ti, V, Cr, Mn, Co, Ni, Cu, Zn, Y, Zr, Nb, Mo, Cd, La, Hf, Ta, and W.

10. The process of manufacturing cement according to claim 9, wherein the mixture contains 5–10 wt % of the transition metal oxide.

11. The process of manufacturing cement according to claim 1, including preparing the mixture by (i) mixing of each of the constituents of the mixture with water to obtain a slurry, (ii) filtering said slurry to obtain a pasty residue, (iii) transforming said pasty residue for introduction into the center of the kiln.

12. The process of manufacturing cement according to claim 11, including transforming the pasty residue by mixing, and extruding plates or strips with approximately constant thickness.

13. The process of manufacturing cement according to claim 1, including moving the mixture in the center of the kiln on rollers.

14. The process of manufacturing cement according to claim 13, wherein the rollers are silicon carbide.

15. The process of manufacturing cement according to claim 14, wherein the rollers are coated with at least one of silicon and MgO—$ZrO_2$.

16. The process of manufacturing cement according to claim 13, wherein the rollers are coated with a refractory stainless steel with a melting point higher than 1400° C.

17. The process of manufacturing cement according to claim 16, wherein the coating of refractory stainless steel consists of sleeves mounted for freely rotating around a roller.

* * * * *